United States Patent [19]
Cleveland et al.

[11] Patent Number: 6,038,916
[45] Date of Patent: Mar. 21, 2000

[54] METHOD AND APPARATUS FOR MEASURING ENERGY DISSIPATION BY A PROBE DURING OPERATION OF AN ATOMIC FORCE MICROSCOPE

[75] Inventors: Jason P. Cleveland, Ventura, Calif.; Boris Anczykowski, Münster, Germany

[73] Assignee: Digital Instruments, Santa Barbara, Calif.

[21] Appl. No.: 08/898,469

[22] Filed: Jul. 22, 1997

[51] Int. Cl.[7] .................................................. G01B 7/34
[52] U.S. Cl. ............................................................ 73/105
[58] Field of Search ............................ 73/105; 250/306, 250/307

[56] References Cited

U.S. PATENT DOCUMENTS

| Re. 34,489 | 12/1993 | Hansma et al. | |
|---|---|---|---|
| 5,047,633 | 9/1991 | Finlan et al. | |
| 5,266,801 | 11/1993 | Elings et al. | |
| 5,406,832 | 4/1995 | Gamble et al. | 73/105 |
| 5,412,980 | 5/1995 | Elings et al. | 73/105 |
| 5,503,010 | 4/1996 | Yamanaka | 73/105 |
| 5,507,179 | 4/1996 | Gamble et al. | 73/105 |
| 5,513,518 | 5/1996 | Lindsay | 73/105 |
| 5,519,212 | 5/1996 | Elings et al. | 73/105 X |
| 5,652,377 | 7/1997 | Yagi | 73/105 |
| 5,760,300 | 6/1998 | Kajimura | 73/105 |
| 5,804,708 | 9/1998 | Yamanaka et al. | 73/105 |

FOREIGN PATENT DOCUMENTS 397 416  11/1990  European Pat. Off. .

OTHER PUBLICATIONS

"Driven Nonlinear Atomic Force Microscopy Cantilevers: From Noncontact to Tapping Modes of Operation", D. Sarid et al., (8th Int'l Conf. on Scanning Tunneling Microscopy/Spectroscopy and Related Techs.), J. of Vacuum Sci. & Tech. B (Microelectronics and Nanometer Structures), Mar.–Apr. 1996, vol. 14, No. 2, pp. 864–867.

"Transient Response of Tapping Scanning Force Microscopy in Liquids", G.Y. Chen et al., (8th Int'l Conf. on Scanning Tunneling Microscopy/Spectroscopy and Rel. Techs.) Mar./Apr. 1996, vol. 14, No. 2; pp. 1313–1317.

"Cantilever Dynamics in Quasinoncontact Force Microscopy: Spectroscopic Aspects", B. Anczykowski et al., Physical Review, Jun. 15, 1996, vol. 53, No. 23, pp. 15485–15488.

"Local Electrical Dissipation Imaged by Scanning Force Microscopy" W. Denk, D. Pohl, Applied Physics Letters, Oct. 21, 1991, vol. 59, No. 17, pp. 2171–2173.

"Numerical Simulations of a Scanning Force Microscope with a Large–Amplitude Vibrating Cantilever" Nanotechnology, J. Chen et al., Oct. 1994, vol. 5, No. 4, pp. 199–204.

(List continued on next page.)

*Primary Examiner*—Daniel S. Larkin
*Attorney, Agent, or Firm*—Nilles & Nilles, S.C.

[57] ABSTRACT

A method and apparatus are provided for measuring energy dissipation during oscillatory operation of an atomic force microscope (AFM). Interaction between the AFM's probe and another medium of interest dissipates energy. This dissipation is reflected by an effect on one or more parameters of probe oscillation such as the amplitude of probe tip oscillation and/or the phase of the probe tip relative to the probe's base. The invention is capable of obtaining an indication of energy dissipated during operation of the AFM by measuring one or more of these parameters and by combining them to produce an energy dissipation signal. In the typical case in which the medium of interest is the sample, an indication is obtained of energy dissipated due to interaction between the probe tip and the sample surface. Obtaining an indication of this energy dissipation can provide information about the effects of this interaction on probe tip wear and can also provide substantial information about sample properties that might not be readily ascertainable through traditional force measurements, if they are ascertainable at all.

17 Claims, 4 Drawing Sheets

OTHER PUBLICATIONS

"Forces Affecting the Substrate in Resonant Tapping Force Microscopy", J. Spatz et al., Nanotechnology, Apr. 1995, vol. 6, No. 2, pp. 40–44.

"Imaging Material Properties by Resonant Tapping–Force Microscopy: A Model Investigation", R.G. Winkler et al. Physical Review B, Sep. 15, 1996, vol. 54, No. 12, pp. 8908–8912.

"Deformation, Contact Time, and Phase Contrast in Tapping Mode Scanning Force Microscopy", Langmuir, Sep. 4, 1996, vol. 12, No. 18, pp. 4430–4435.

"Short Cantilevers for Atomic Force Microscopy", D.A. Walters et al., Rev. Sci. Instrum. 67(10), Oct. 1996.

"Dynamic Viscoelastic Properties of Liquid Polymer Films Studied by Atomic Force Microscopy", Langmuir, Dec. 11, 1996, vol. 12, No. 25, pp. 6138–6142.

"Basic Properties of Dynamic Force Spectroscopy with the Scanning Force Microscope in Experiment and Simulation", Ultramicroscopy, Dec. 1996, vol. 66, No. 3–4, pp. 251–259.

"Phase Imaging and Stiffness in Tapping–Mode Atomic Force Microscopy", S.N. Magonov et al., Surface Science, Apr. 1, 1997, vol. 375, No. 2–3, pp. L385–L391.

"Role of Attractive Forces in Tapping Tip Force Microscopy", J. of App. Physics, May 15, 1997, vol. 81, No. 10, pp. 6562–6569.

"How Does a Tip Tap?", N.A. Burnham et al., Nanotechnology, Jun. 1997, vol. 8, No. 2, pp. 67–75.

"Magnetic Dissipation Force Microscopy", App. Physics Letters, P. Grutter et al., Jul. 14, 1997, vol. 71, No. 2, pp. 279–281.

"Contact Angle Microscopy on Carbosilane Dendrimer with Hydroxyl End Groups: Method for Mesocopic Characterization of the Surface Structure", Langmuir, Jul. 23, 1997, vol. 13, No. 15, pp. 4172–4181.

"Tapping Scanning Force Microscopy in Air–Theory and Experiment", Langmuir et al., Aug. 20, 1997, vol. 13, No. 17, pp. 4699–4703.

"Theory of Magnetic Dissipation Imaging", Y. Liu et al., App. Physics Letters, Sep. 8, 1997, vol. 71, No. 10, pp. 1418–1420.

"Height Anomalies in Tapping Mode Atomic Force Microscopy in Air Caused by Adhesion", S.J.T. Van Noort et al., Ultramicroscopy, Sep. 1997, vol. 69, No. 2, pp. 117–127.

"Effects of Elastic and Inelastic Interactions on Phase Contrast Images in Tapping–Mode Scanning Force Microscopy", App. Physics Letters, Oct. 20, 1997, vol. 71, No. 16, pp. 2394–2396.

"Tapping–Mode Atomic Force Microscopy Study of the Near–Surface Composition of a Styrene–Butadiene–Styrene triblock Copolymer Film", S.N. Magonov et al., Surface Science, Nov. 6, 1997, vol. 389, No. 1–3, pp. 201–211.

"Tip–Sample Force Interactions and Surface Stiffness in Scanning Probe Microscopy", M. Whangbo et al., Probe Microscopy, vol. 1, pp. 23–42, 1997.

"Air–Damping of Resonant AFM Micro–Cantilevers in the Presence of a Nearby Surface", F. Serry et al., Univ. of Illinois at Chicago, pp. 1–6, J. of The Electromechanical Society, vol. 95.

......... RETRACT
——— APPROACH

METHOD AND APPARATUS FOR MEASURING ENERGY DISSIPATION BY A PROBE DURING OPERATION OF AN ATOMIC FORCE MICROSCOPE

BACKGROUND OF THE INVENTION

1. Field of the Invention

The invention relates to atomic force microscopes and, more particularly, relates to a method and apparatus for measuring energy dissipation during operation of an atomic force microscope such as during interaction between the probe and a sample scanned by it.

2. Discussion of the Related Art

Atomic Force Microscopes (AFMs) operate by scanning a probe over a surface using a high resolution three axis scanner, usually creating relative motion between the probe and the sample while measuring the topography or some other surface property of the sample as described, e.g., in Hansma et al. U.S. Pat. No. RE 34,489; Elings et al. U.S. Pat. No. 5,226,801; and Elings et al. U.S. Pat. No. 5,412,980. AFMs typically include a probe, usually comprising a very small cantilever which is fixed at one end and which has a sharp probe tip attached to the opposite end. The probe tip is brought very near to or into contact with a surface to be examined, and the deflection of the cantilever in response to the probe tip's interaction with the sample surface is measured with an extremely sensitive deflection detector, often an optical lever system such as described in Hansma et al, or some other deflection detector such as strain gauges, capacitance sensors, etc. Using piezoelectric scanners, optical lever deflection detectors, and very small cantilevers fabricated using photolithographic techniques, AFMs can obtain resolution down to the atomic level on a wide variety of insulating or conductive surfaces in air, liquid or vacuum. Because of their resolution and versatility, AFMs are important measurement devices in many diverse fields ranging from semiconductor manufacturing to biological research.

Typical of microscopes employing oscillation of a probe tip to measure properties of a sample are those operating in the intermittent contact mode, including those operating in the "TappingMode" and the "light TappingMode" ("Tapping" and "TappingMode" are trademarks of Veeco Instruments, Inc.) and those operating in the magnetic mode. AFMs operating in the Tapping and light Tapping modes detect changes in probe oscillation due to contact with the sample surface to obtain an indication of the topography or other properties of the sample surface. AFMs operating in the magnetic mode, usually known as "magnetic force microscopes" or "MFMs", employ a magnetic probe tip and detect changes in the probe oscillation that are due to magnetic interaction between the tip and sample.

There are two primary ways of studying a mechanical system upon interaction of that system with another system (such as upon interaction of an AFM with a sample): either (1) forces or (2) energy. Considering the name of the field with which this invention pertains (atomic force microscopy), it is not surprising that the dominant approach to treating the interaction between a probe tip and a sample is to consider the forces resulting from this interaction. For instance, recent modeling of TappingMode AFMs has focused on addressing a differential equation of motion for the cantilever which includes a non-linear term to account for the tip sample interaction and then solving that differential equation, usually numerically. Although this force-based approach has historically worked quite well, it has the disadvantage of requiring the explicit solution of equations of motion.

The significance of taking an energy-based approach to the study of AFMs can be appreciated if one thinks of the probe/sample interaction in terms of energy imparted to the sample or another medium of interest by the probe tip (or taken away from the probe tip by the medium of interest) per interaction. In an AFM operating at a 300 kHz cycle and dissipating one picowatt of power per cycle, only $\frac{1}{300,000}$th of a joule of energy is dissipated per cycle or about 21 ev per cycle. The energy of the bonds between atoms or molecules of relatively hard crystalline materials is generally about 5 ev. Hence, sufficient energy is dissipated to a sample during typical operation of an AFM to break between four and five atomic bonds of a hard substance. This dissipated energy is distributed between the probe tip and the sample in a proportion depending upon, among other things, the contact area between the probe tip and sample and the relative strengths of the bonds connecting the molecules of the probe tip and the molecules of the sample. Measuring energy dissipation during operation of an AFM could prove useful in a variety of scenarios.

For instance, measuring energy dissipation can provide information about probe tip wear and even reduce it. Probe tip wear is undesirable because, as a probe tip wears, it becomes more blunt and increases the contact area between the tip and the sample. This increased contact area is counterproductive because AFMs typically seek to maximize resolution by minimizing contact area between the probe tip and the sample. The composition of the probe tip (and, accordingly, the strength of the bonds connecting the molecules of the probe tip to one another) generally is known. If it is known that the molecular bonds of a probe tip will begin to break if the energy dissipation due to probe tip/sample interaction is above, for instance, 5 ev per cycle, then the operation of the AFM can be controlled to maintain the energy dissipation per cycle below that level, thereby reducing undesired probe tip wear and enhancing the performance of the AFM.

Measuring energy rather than or in addition to measuring force can also be useful in the study of relatively elastic substances such as polymers. The molecules of many polymers exhibit a so-called "visco-elastic" quality in that they have elasticity (i.e., they return to their original shape after being stretched within limits) and they also have substantial internal friction that dissipates energy when they are elastically deformed. For instance, a rubber band will become noticeably warmer when it is stretched. In the case of AFM operation in intermittent contact mode, the polymer material deforms and dissipates energy every time the probe tip contacts it during intermittent contact. The dissipated energy comes from the kinetic energy lost when the probe tip interacts with the polymer surface. Measuring energy dissipated by the probe tip during this interaction therefore can provide an indication of visco elasticity of polymers.

Measuring energy dissipation is also useful when studying biological samples because it can provide an indication of the type(s) of bonds present in the samples. Molecular bonds in many biological systems can be thought of as "lock and key" interactions. One molecule (the key) fits precisely into another molecule (the lock). It is possible to prepare an AFM to have a "key" molecule on the probe tip and to prepare a sample to have a "lock" molecule on its surface. Then, "lock and key" bonds will form every time the probe tip approaches the sample. These bonds then break as the probe tip moves away from the sample, thereby dissipating energy.

Energy dissipation can also be useful when operating an MFM. That is, during operation of an MFM, the magnetic field emanating from the probe tip will magnetize the sample as the probe tip approaches the sample surface. Energy dissipation necessarily accompanies this induction. Measuring this energy dissipation can provide a separate indication of the sample property.

The above examples are not intended to constitute an exhaustive list of applications in which measuring energy dissipation during AFM probe operation is desirable but instead to illustrate that measuring such dissipation can be used to acquire a wealth of information about a probe, a sample, or both that might not be readily available simply by measuring forces during probe operation.

OBJECTS AND SUMMARY OF THE INVENTION

The primary object of the invention therefore is to measure energy dissipation during operation of an atomic force microscope (AFM) such as the dissipation resulting due to interaction between the probe and an associated sample.

Considered in its broadest context, the invention involves the measurement of at least one effect of energy dissipation on probe oscillation and the determination, based on this measurement, of a value indicative of the energy dissipation. Measured effects may be effects on probe oscillation amplitude and/or phase. The dissipation of interest typically will arise from oscillatory interaction between the probe and a sample. The value indicative of dissipated energy may include average power per oscillation cycle or a dimensionless value indicative of relative dissipation.

This object has been achieved in a remarkably simple and effective manner simply by measuring parameters including probe oscillation amplitude and/or phase while the probe interacts with a sample or another medium of interest and by determining, from these measured parameters, a value indicative of energy dissipated during this interaction.

Preferably, the method includes placing the probe in an operative position in which it is in oscillatory interaction with the sample, measuring an amplitude of probe oscillation and generating an amplitude signal indicative thereof, measuring a phase shift of the cantilever free end relative to the cantilever base and generating a phase signal indicative thereof, and combining the phase and amplitude signals and generating a dissipation signal indicative of energy dissipated due to interaction between the probe and the sample. The dissipation signal can then be stored, displayed, and/or combined with other signals and used in additional calculations.

Additional amplitude and phase measurements are preferably performed at a reference position spaced just above the scanning position so as to permit the elimination of substantially all background dissipation from the calculated dissipation value.

A preferred mode of determining energy dissipation is to use the equation:

$$\overline{P_{tip}} = \frac{1}{2}\frac{kA^2\omega_0}{Q}\left[\left(\frac{A_0}{A}\right)\sin\varphi - 1\right]$$

where:

k is the spring constant of the probe cantilever;

$A_0$ is the amplitude of the cantilever at resonance;

Q is quality factor indicative of the energy dissipated by operation of the probe in the reference position; and $\omega_o$ is the natural resonant frequency of the cantilever in the absence of any energy dissipation;

A=the amplitude of cantilever free end (probe tip) oscillation; and

φ=the phase shift of the cantilever free end relative to the cantilever base.

Another object of the invention is to provide an atomic force microscope (AFM) that incorporates features to determine a value indicative of energy dissipated during probe operation.

In accordance with another aspect of the invention, this object is achieved by providing an AFM including a probe, a driver which drives the probe to oscillate, detectors, and a computer. The probe includes (1) a cantilever having a base and a free end and (2) a probe tip mounted on the free end of the cantilever. The detectors include a detector which measures an amplitude of probe oscillation and which generates an amplitude signal indicative thereof and a detector which measures a phase shift of the cantilever free end relative to the cantilever base and which generates a phase signal indicative thereof. The computer is operatively coupled to the detectors, combines the phase and amplitude signals with data indicative of physical properties of the probe, and generates a dissipation signal indicative of energy dissipated due to interaction between the probe and the sample. The detectors may comprise a phase detector and a separate RMS detector, a combined two-phase lock-in amplifier, or the like.

These and other objects, features, and advantages will become apparent from those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

1. Resume

Pursuant to the invention, a method and apparatus are provided for measuring energy dissipation during oscillatory operation of an atomic force microscope (AFM). Interaction between the AFM's probe and another medium of interest dissipates energy. The energy dissipation is reflected by an effect on one or more parameters of probe oscillation such as the amplitude of probe tip oscillation and/or the phase of the probe tip relative to the probe's base. The invention is capable of obtaining an indication of energy dissipated during operation of the AFM by measuring one or more of these parameters and by combining them to produce an energy dissipation signal. In the typical case in which the medium of interest is the sample, an indication is obtained of energy dissipated due to interaction between the probe tip and the sample surface. Obtaining an indication of this energy dissipation can provide information about the effects of this interaction on probe tip wear and can also provide substantial information about sample properties that might not be readily ascertainable through traditional force measurements, if they are ascertainable at all.

2. System Overview

Figure 1:
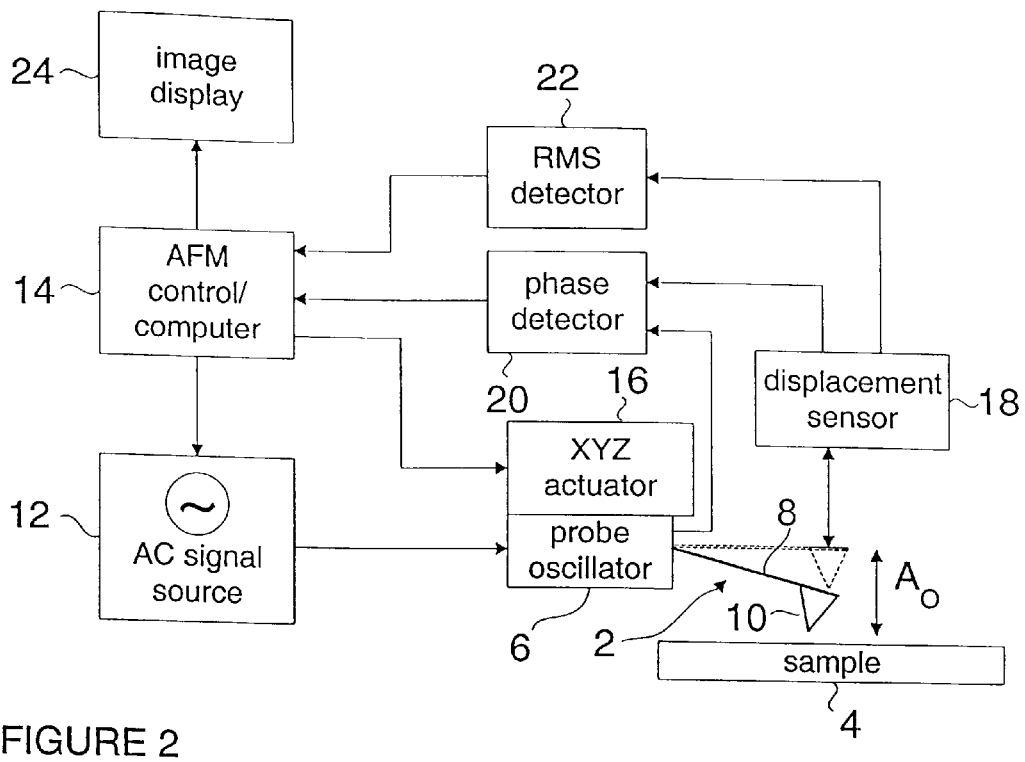
FIG. 1 schematically represents an AFM constructed in accordance with the present invention and operating in a free oscillation mode in which the probe tip of the microscope does not contact the surface of the sample.
Figure 2:
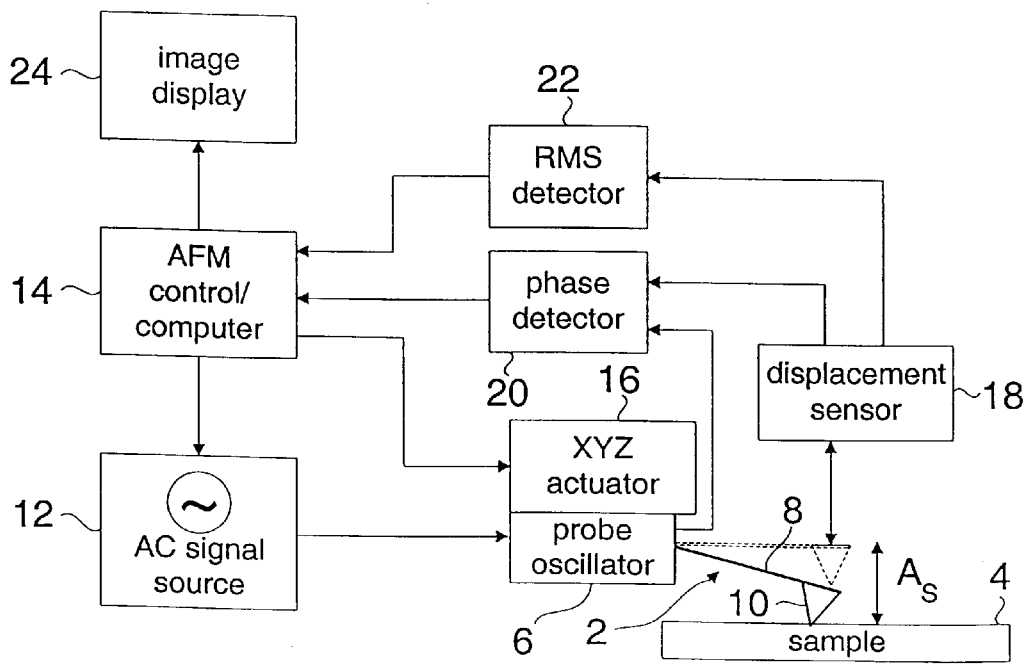
FIG. 2 corresponds to FIG. 1 and illustrates operation of the AFM in an operative or scanning mode in which the probe tip is in intermittent contact with the sample.

Turning now to the drawings and initially to FIGS. 1 and 2 in particular, an AFM is schematically illustrated to which the present invention is applicable. The illustrated AFM is designed to operate in intermittent contact mode such as TappingMode or light TappingMode. It is to be understood, however, that the invention is equally applicable to other oscillating microscopes such as a magnetic force microscope (MFM). The AFM includes a probe 2 which scans a sample 4 by intermittent contact with it. The probe 2 is attached to an oscillator 6 which can drive the probe 2 appropriately, usually at or near the probe's resonant frequency. The probe 2 includes a cantilever 8 having a base fixed to the oscillator 6 and a free end on which is mounted a probe tip 10. An electronic signal is applied from an AC signal source 12, under control of a computer 14, to the oscillator 6 to drive the probe tip 10 to oscillate at a free oscillation amplitude $A_o$. The probe 2 can also be driven towards and away from the sample using a suitable actuator 16 also controlled by the computer 14. It should be noted that rather than being configured for driving the probe 2 towards the sample 4 as illustrated, the AFM could be configured for mounting the sample 4 on a movable base so that the actuator 16 moves the sample 4 towards and away from the probe 2.

Probe movement is monitored by a suitable displacement sensor 18. A phase detector 20 receives signals from this displacement sensor 18 and from the oscillator 6 to detect the phase of the probe tip 10 relative to that of the oscillator 6 as detailed below and to send a single indicative thereof to the computer 14. An RMS detector 22 also receives signals from the displacement sensor 18, measures the amplitude of probe tip displacement as an RMS value of the AC deflection signal, and transmits a signal indicative thereof to the computer 14. As is known in the art and described in some detail in Section 3 below, the signals from the phase detector 20 and RMS detector 22 can be combined with one another and used to generate signals indicative of probe oscillation amplitude, frequency, and phase (alternatively, the detectors 20 and 22 could be replaced by a two-phase lock-in amplifier or the like as discussed below). Finally, a suitable display device 24 is connected to the computer 14 and displays a humanly-discernable image (such as a video image) of an output signal, such as average power dissipated by the probe tip 10 during each cycle of probe oscillation.

As shown in FIG. 2, when the actuator 16 is energized to move the probe 2 near the surface of the sample 4 and the probe tip 10 taps the surface of sample 4 at the bottom of each oscillation cycle, the probe tip 10 oscillation amplitude decreases from $A_o$ to $A_s$. A preset value of $A_s$ typically is used as a setpoint for the vertical feedback servo function for the actuator 16, so the illustrated Tapping AFM scans at a predetermined decrease from the free amplitude $A_o$. Since the probe tip 10 only touches the sample 4 for a short interval at the bottom of each cycle, lateral forces during scanning are virtually eliminated, thereby overcoming a major limitation of contact mode AFM. TappingMode is capable of providing stable operation with good image quality and has become the most commercially successful AFM mode.

Atomic force microscopes as thus far described are well-known to those skilled in the art. Those skilled in the art also know how to measure probe tip oscillation amplitude and phase as described, e.g., in U.S. Pat. No. 5,519,212 to Elings et al. (the Elings '212 patent), the subject matter of which is hereby incorporated by reference in its entirety. The invention involves the use of at least some of these measurements and possibly other data to measure energy dissipated during operation of an AFM and to generate and display signals indicative thereof.

3. Theory of Operation

Energy dissipation measurement can be best understood by understanding the operation of a vibrating or oscillating cantilever from the standpoint of energy conservation. A vibrating cantilever necessarily dissipates energy, and the total energy of the system therefore is not conserved. However, at equilibrium, the law of the conservation of energy requires that the average rate at which energy is fed into the cantilever 8 from the oscillator 6 must equal the average rate at which the energy leaves the cantilever 8. Hence, the average power ($\overline{P}$) per cycle is conserved. The average power input to the probe 2 by the oscillator 6 or driver therefore can be equated to the average power dissipated by the probe 2 (quantities averaged in this way are denoted by an overhead bar). This power dissipation is reflected by effects on one or more parameters of probe oscillation.

The probe 2 dissipates power even when it is not interacting with the sample 4. It therefore is convenient to break dissipated power into two components, $\overline{P}_o$ and $\overline{P}_{tip}$. The first component ($\overline{P}_o$) can be thought of as background power dissipation and may be of interest in its own right but usually is of interest only because it needs to be eliminated for determining the second component ($\overline{P}_{tip}$). $\overline{P}_{tip}$ is the average power per cycle dissipated by the probe tip 10 as a result of interaction with the sample 4 and will usually (but not always) be the dissipation of interest. In most cases, $\overline{P}_o$ includes average power per cycle dissipated by the body of the cantilever 8, while $\overline{P}_{tip}$ includes average power per cycle dissipated due to sources of dissipation localized to a small volume including the tip and the sample.

In ambient operation, the two greatest estimated causes of $\overline{P}_o$ are air damping and squeeze film damping. Air damping is self-descriptive, resulting from interaction between the cantilever 8 and the ambient environment. Air damping occurs whenever the probe 2 is oscillating whether it is far away from the sample 4, at a reference position R near the sample 4, or at a scanning position S proximate the sample 4 in which scanning by intermittent contact with the sample takes place. Squeeze film damping, on the other hand, occurs when the body of the cantilever 8 nears the surface of the sample 4. For typical cantilevers, the squeeze film damping can be observed when the distance between the cantilever body and the sample is less than approximately 50 microns. Squeeze film damping and its effects are discussed at some length in "Air-Damping of Resonant AFM Micro-Cantilevers in the Presence of a Nearby Surface", Serry et al., The Journal of Electromechanical Society, Vol. 95–27, 1995. (The Serry et al. paper). The Serry et al. paper is hereby incorporated by reference in its entirety by way of background information. As detailed in Section 4 below, the reference position R preferably is located at a position in which squeeze film damping is encountered.

The AFM probe 2 can be considered an oscillating cantilever 8 whose base is driven sinusoidally by the oscillator 6 with a drive amplitude $A_d$ and a drive frequency $\omega$. Power dissipation therefore can be measured by comparing the oscillation of the probe tip 10 to the drive oscillation delivered by the oscillator 6. It has been discovered that the average power dissipated during operation of the oscillating cantilever 8 can be measured using the following values:

k=the spring constant of the cantilever 8;

b=the viscous damping coefficient;

$\omega_o$=the natural resonant frequency of the cantilever in the absence of any energy dissipation;

A=the amplitude of cantilever free end (probe tip) oscillation; and $\phi$=the phase shift of the cantilever free end relative to the cantilever base.

Of these values, only two, A and $\phi$, need to be measured each time an energy dissipation measurement is performed. The value of $\phi$ can be measured by the phase detector 20 as discussed in the Elings '212 patent. The value of A can be measured using the displacement sensor 18 and the RMS detector 22 also as discussed in the Elings '212 patent. Alternatively, a two-phase lock-in amplifier (or any other suitable device(s)) could be incorporated into the AFM to measure both phase and amplitude. The manner in which these measurements can be used to determine average power dissipation per cycle now will be detailed.

Equating the average power input per cycle and the average power dissipated per cycle during operation of the AFM yields the equation:

$$\bar{P}_{in}=\bar{P}_o+\bar{P}_{tip}. \tag{1}$$

Addressing Equation (1) for the case of an oscillating cantilever 8 which has a spring constant k and which is driven sinusoidally by the oscillator 6 with a drive amplitude $A_d$ and a drive frequency $\omega$, $\bar{P}_{in}$ is calculated first. Displacement of the cantilever base as a function of time can be denoted as $z_d(t)$. Sinusoidal motion therefore can be represented by the equation $z_d(t)=A_d \cos\omega t$. Assuming that the cantilever displacement remains sinusoidal as a function of time, then the deflection from equilibrium of the free end of the cantilever 8 can be written as $z(t)=A\cos(\omega t+\phi)$.

The instantaneous power delivered by the oscillator 6 is the force on the driver times its velocity. Hence, the instantaneous value of $P_{in}$ can be represented by the equation:

$$\begin{aligned} p_{in} &= F\dot{z}_d = k[z(t) - z_d(t)]\dot{z}_d \\ &= k[A\cos(\omega t + \varphi) - A_d\cos\omega t][-A_d\omega\sin\omega t] \end{aligned} \tag{2}$$

where a dot over a variable represents differentiation with respect to time, so $\dot{z}_d$ is the velocity of cantilever base motion.

Average power supplied per cycle can be obtained by integrating Equation 2 over a complete number of cycles. This integration yields:

$$\bar{P}_{in}=\tfrac{1}{2}kA_dA\omega\sin\phi \tag{3}$$

It should be noted that Equation 3 is still valid even if cantilever displacement is non-sinusoidal so long as the motion of the cantilever 8 is periodic in a harmonic or even in a subharmonic of the drive frequency $\omega$. If the non-sinusoidal displacement z(t) were expanded in a Fourier series, then only the term proportional to sin $\omega t$ would survive the averaging integration, provided that the integration is over the longest period of the motion.

The next step in determining $\bar{P}_{tip}$ is to measure the average background dissipation $\bar{P}_o$ per cycle which, in the most general sense, can be considered all components of average power dissipation per cycle other than the component of interest. For present purposes, $\bar{P}_o$ will be considered the average power dissipation per cycle arising from viscous damping of the cantilever 8. The frictional force exerted on the cantilever 8 therefore can be represented by $F_{fric}=b\dot{z}$. The instantaneous background power dissipated by the cantilever 8 therefore can be represented by:

$$P_o=F_{fric}\dot{z}=b\ \dot{z}^2=bA^2\omega^2\sin(\omega t+\phi). \tag{4}$$

The average background power dissipation per cycle therefore can be represented by the equation:

$$\bar{P}_o=\tfrac{1}{2}bA^2\omega^2 \tag{5}$$

Now that $\bar{P}_{in}$ and $\bar{P}_o$ are known, Equation 1 can be solved as a function of cantilever operation using the following equation:

$$\bar{P}_{tip} = \bar{P}_{in} - \bar{P}_0 = \frac{1}{2}kA^2\omega\left[\frac{A_d\sin\varphi}{A} - \frac{b\omega}{k}\right] \tag{6}$$

A potentially more useful way to express the motion of an oscillator subject to viscous damping is through a quality factor Q which equals $k/b\omega_o$, where $\omega_o$ is the natural resonant drive frequency delivered by the oscillator 6 in the absence of any dissipation. Q could be considered an amplification ratio of cantilever end amplitude versus drive amplitude at resonance. For instance, if the cantilever 8 is driven at the oscillator's resonant frequency $\omega_o$ and at a drive amplitude $A_d$ of 0.1 nm, and if Q in free air is 300, the amplitude of probe tip movement in free air is 300×0.1 nm or 30 nm. Tapping cantilevers typically have quality factors in the range of 100–400. The quality factor Q and its measurement are discussed at some length in "Short Cantilevers for Atomic Force Microscopy", Walters et al., Rev. Sci. Instnim., 67(10), October 1996, the subject matter of which is hereby incorporated by reference by way of background information.

Measuring Q is useful because the damping coefficient b is difficult to measure and because b (and hence Q) may vary significantly depending upon ambient conditions and upon the squeeze film damping effect of the film layer adjacent the sample surface. For instance, the cantilever 8 may have a Q of 300 when resonating in free air while it is located above the sample surface but a Q of less than 150 when it is located near the sample surface where it is subjected to squeeze film damping. Measuring Q therefore can considerably simplify measurements because one need not know the value of the damping coefficient b in advance and hence need not know the exact properties of either the air or other environment in which oscillation is occurring or of the film layer creating the squeeze film damping effect.

Figure 5:
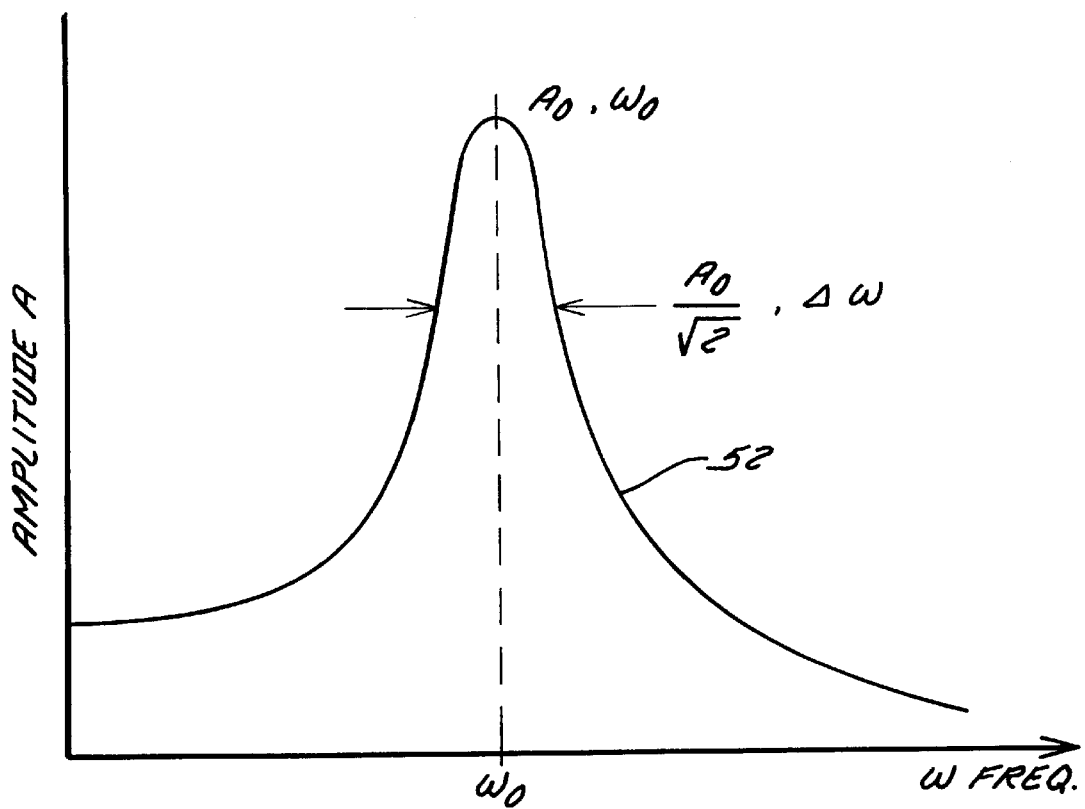
FIG. 5 is a graph plotting amplitude vs. frequency.

The values of $\omega_o$, k, and Q can be measured simply by turning the driver off ($A_d$=0), and then measuring the thermal motion of the cantilevers from which $\omega_o$, k, and Q can be derived. See Walters, et al. cited previously. Alternatively, for high quality factors, the value of $\omega_o$ and Q can be determined by turning the driver on and making two measurements, one of $\omega_o$ and one of Q. The value of $\omega_o$ can be measured by sweeping the drive frequency to determine the frequency ω at which the maximum probe tip amplitude $A_o$ is obtained as detailed below. The value of Q may be measured by sweeping the frequency of the oscillator 6 and obtaining a measurement of the width of the resonant peak of the cantilever at amplitude $$\frac{A_0}{\sqrt{2}}$$

on either side of the peak as shown by the curve 52 in FIG. 5. Hence, $Q=\omega_o/\Delta\omega$, where $\Delta\omega$ is the measured width and the resonant peak.

The substitution of Q for the expression $k/b\omega_o$ in Equation 6 yields the equation:

$$\overline{P_{tip}} = \frac{1}{2}\frac{kA^2\omega}{Q}\left[\frac{QA_d\sin\varphi}{A} - \frac{\omega}{\omega_0}\right] \quad (7)$$

Simplification may occur if the drive frequency ω is chosen to be the resonant drive frequency $\omega_o$ because the free oscillation amplitude of the cantilever free end then becomes $QA_d$. Denoting this amplitude $A_o$ yields the equation:

$$\overline{P_{tip}} = \frac{1}{2}\frac{kA^2\omega_0}{Q}\left[\left(\frac{A_0}{A}\right)\sin\varphi - 1\right] \quad (8)$$

Experimental simplifications also occur in applications in which the Q is relatively high (as is typically the case in AFMs). The first such simplification involves finding the resonant drive frequency $\omega_o$. If the amplitude A of the cantilever free end is monitored while the drive frequency ω is swept or varied, and if Q is >>1, $\omega_o$ occurs very close to the frequency where A is maximized as $A_o$. Hence, $\omega_o$ can be found experimentally simply by recording the frequency at which a $A_o$ occurs.

The second simplification involves use of the commonly-used optical lever detection scheme. All of the above derivations used the displacement of the cantilever 8 in a stationary lab frame to obtain z(t). Since an optical lever measures bending of a cantilever relative to its base, it measures $\hat{z}(t)=z(t)-z_d(t)$. Using $\hat{z}$ instead of z does not affect the $\overline{P}_{in}$ calculation because it is precisely $\hat{z}$ that appears in Equation 2. Using z does affect the $\overline{P}_o$ calculation because the velocity of the cantilever relative to the stationary surrounding gas or fluid is the important parameter, but in the case of a high Q cantilever driven at $\omega_o$, the $A_d$ is much smaller than A, and $\hat{z}\approx z$. These simplifications are not applicable when the invention is used in water or other fluids because of the low Q of the cantilever. See Walters et al. cited previously.

A further simplification may occur if one is merely interested in obtaining an indication of relative power dissipation at different parts of the sample or under different operating conditions rather than an indication of the magnitude of power being dissipated. Relative power dissipation may in fact be as helpful as the magnitude of the power dissipation in many applications. This relative power dissipation ($P_{rel}$) can be determined according to the equation:

$$P_{rel} \propto \overline{P_{tip}}/\overline{P_o} \alpha A^2[(A_o/A)\sin\varphi-1] \quad (9)$$

Obtaining this relative power measurement is relatively simple because the values of k or Q need not be known or determined.

The resolution to expect with the invention can also be determined when one recognizes that $\overline{P}_{air}=\frac{1}{2} k A^2 \omega/Q$. In a typical scenario in which k is 50 N/m, Q=300, $w_0=2\pi\times300$ kHz, and A=10 nm, $\overline{P}_{air}=16$ pW. Accordingly, in a single cycle, $\Delta E=2\pi/\omega\times\overline{P}_{air}=5\times10^{-17}j=327$ ev. If a system is capable of resolving one part in 300 (which means measuring amplitude with a 0.3 Å resolution and phase with a 0.3° resolution), then the system can resolve 1 ev per cycle.

Figure 4A:
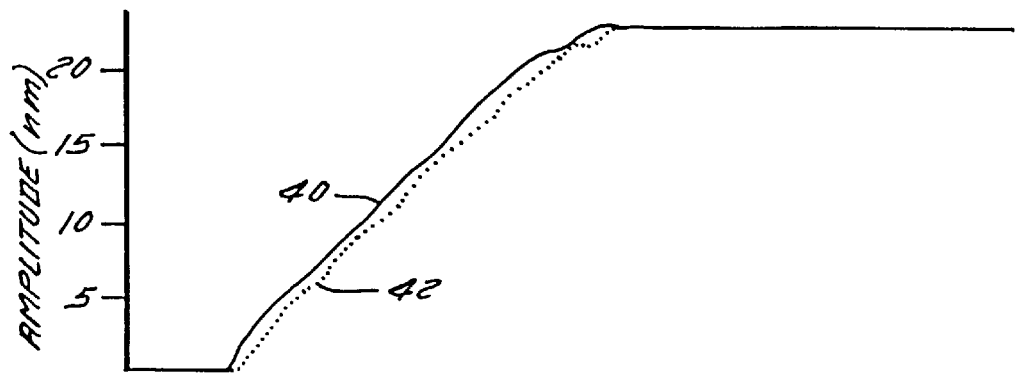
FIGS. 4A–4C are graphs of amplitude, phase, and power, respectively vs. probe tip-to-sample distance during operation of the AFM of FIGS. 1 and 2.
Figure 4B:
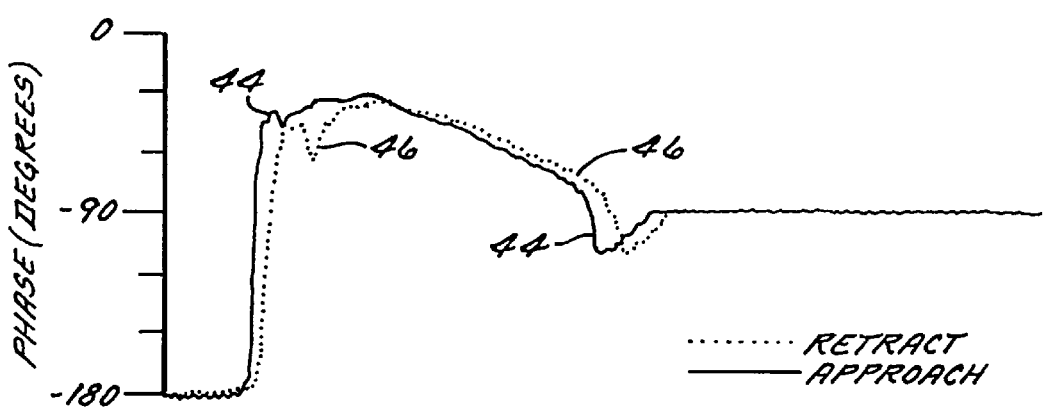
Figure 4C:
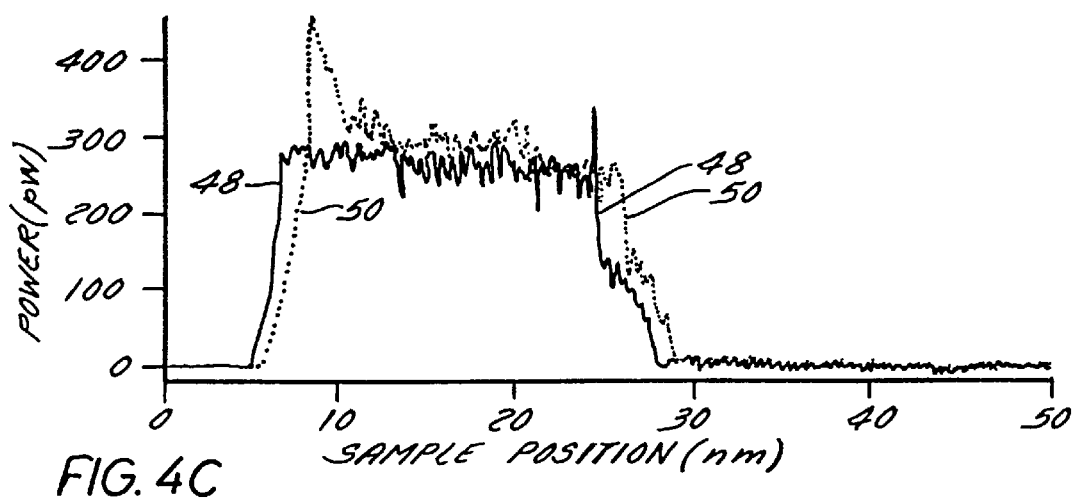

Typical relationships between amplitude A, phase φ, and average power dissipation per cycle ($\overline{P}_{tip}$) are illustrated graphically in FIGS. 4A–4C. Curves 40 and 42 in FIG. 4A illustrate that the amplitude A varies substantially linearly with tip-to-sample distance from a maximum of about 30–35 nm beyond which the probe tip 10 is placed in free oscillation in which it does not interact with the sample 4, i.e., when its oscillation is not affected by either the sample, the film layer adjacent to the sample, or any other near-surface effects, to 0 nm when the probe tip 10 is pressed into full contact with the sample 4.

Curves 44 and 46 in FIG. 4B illustrate that phase responses to changes in probe tip-to-sample distance are much less linear, with the phase φ being −90° when the probe tip is not affected by the sample or near-surface effects, then transistioning to approximately −30°, and then abruptly decreasing to −180°.

Finally, FIG. 4C illustrates that when amplitude and phase are combined to generate a power dissipation measurement $\overline{P}_{tip}$, the energy dissipation curves 48 and 50 take on a flattened shape as the probe 2 moves toward the sample 4, (or retracts from it). As is seen, power dissipation does not vary substantially with amplitude.

4. Practical Application

The practical uses of an energy-based approach to AFM operation can become apparent though a practical example in which $\overline{P}_{tip}$ is measured during operation of an AFM operating in TappingMode. Since TappingMode operation of an AFM is, per se, well known, the procedures for instituting and continuing a scan operation in TappingMode will not be detailed.

In a typical preferred operation at $\omega_o$, scanning will occur with the oscillator 6 supplying a drive signal of fixed amplitude and frequency $\omega_o$ to the cantilever base and with the x,y,z actuator 16 being controlled in a feedback operation to maintain a desired amplitude $A_s$ during scanning. A preferred energy dissipation measurement for drive frequency at $\omega_o$ can then be performed by the computer 14 using Equation 8 and the routine illustrated in FIG. 3.

After proceeding from Start in Step 3-1, the routine proceeds to Step 3-2 in which the probe 2 is placed in a scanning position (S) to establish the location of the sample surface. At Step 3-3, the probe 2 is lifted to a reference position (R). Properly selecting the location of the reference position R relative to the scanning position S is important if one wishes to obtain an accurate indication of $\overline{P}_o$ and hence of $\overline{P}_{tip}$. The reference position R should be located as close as possible to the scanning position S without actually permitting any contact between the probe tip 10 and the sample surface so that squeeze film damping effects and other near-surface effects of probe oscillation that do not result directly from the interaction of interest between the probe tip 10 and the sample 4 can be included in the determination of $\overline{P}_o$. The distance between the reference position R and the scanning position S typically will be less than 100 nm and more typically on the order of about 10 nm to 20 nm. Of course, the reference position R may vary depending upon exactly which energy dissipations are of interest to the user. It is conceivable that there may be situations in which squeeze film damping is also of interest, in which case the reference position R would be spaced a much greater distance from the scanning position S.

At Step 3-4, $\omega_o$ and Q, and $A_o$ are measured, preferably using one or more of the techniques described in Section 3 above. If necessary, the drive frequency may be readjusted to the recently measured $\omega_o$. For operations in which the probe is not driven at resonance ($\omega_o$), $A_d$ can be determined from knowledge of $A_o$, Q, and $\omega_o$. In the preferred method, it is assumed that k is measured prior to Step 3-1 and need not be remeasured.

The routine then returns the AFM to its operating mode (such as a TappingMode or light TappingMode scanning operation) in Step 3-5 by lowering the probe 2 back to the scanning position S. The values of A and $\phi$ then are measured in Step 3-6 using the displacement sensor 18, RMS detector 22, and phase detector 20 (or via any other suitable device such as a two-phase lock-in amplifier) as detailed in Section 3 above. Note that measuring A is not strictly necessary because the feedback loop should hold A very close to $A_s$. The $\phi$ could also be held constant by frequency feedback instead of or in addition to holding A constant by amplitude feedback. If both A and $\phi$ are held constant, then the AFM would map contours of constant energy dissipation. Next, the average power dissipated per cycle of probe oscillation is determined and a signal $\overline{P}_{tip}$ indicative thereof is generated in Step 3-7 using Equation 8. Of course, other values could be read and measured so that other equations such as Equation 6 or 7 could be used to obtain the desired energy dissipation reading. Signal $\overline{P}_{tip}$ can be stored and/or transmitted to display device 24 at Step 3-8 for display, and/or combined with other signals to aid in additional calculations. The routine then returns to Step 3-5.

Figure 3:
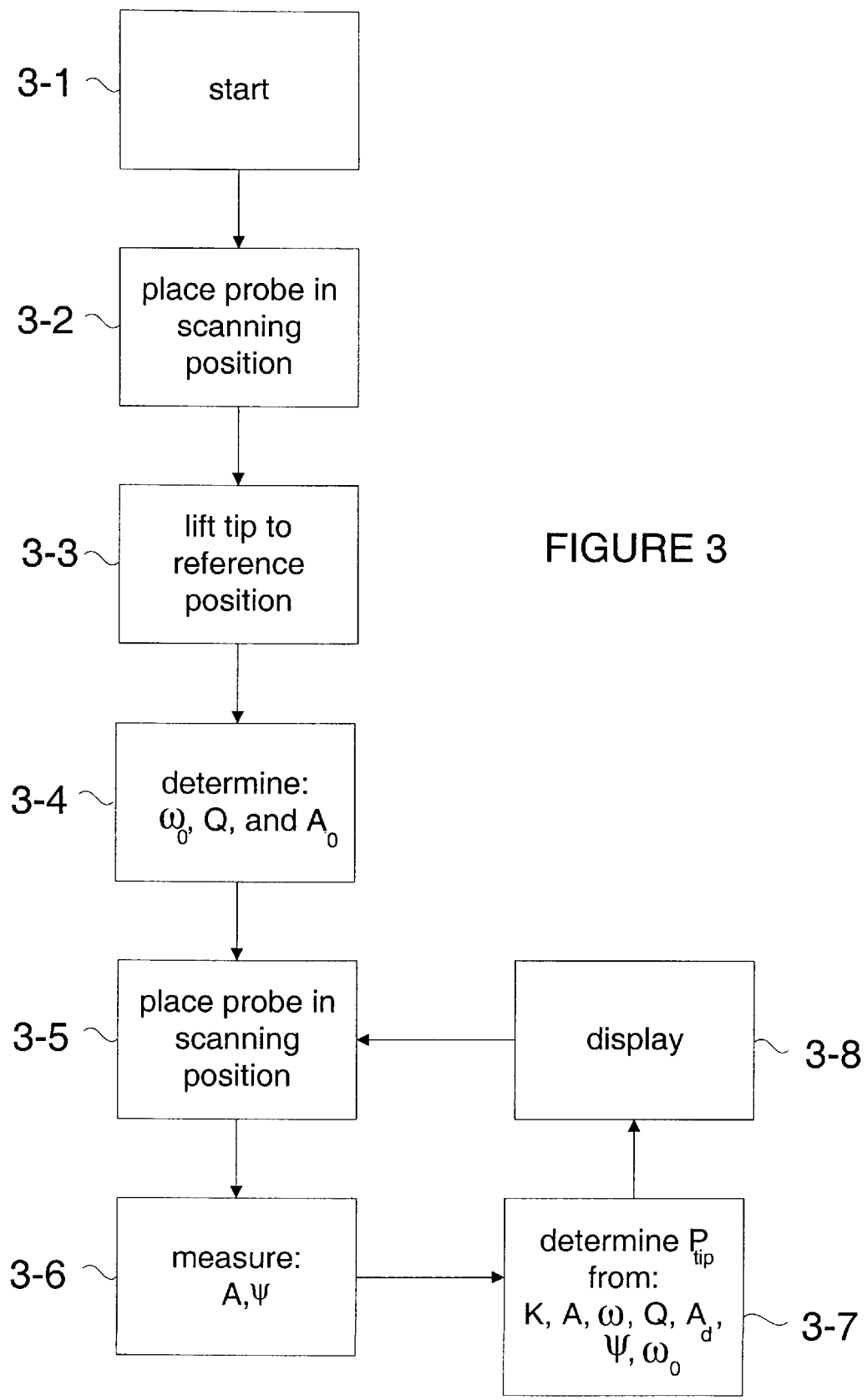
FIG. 3 is a flowchart of a process for measuring energy dissipated by the probe tip during operation of the AFM of FIGS. 1 and 2.

At least the energy dissipation measurement portions of the routine of FIG. 3 preferably are repeated at regular, brief intervals during a raster scan or similar operation so that the energy dissipation $\overline{P}_{tip}$ signal may be stored and displayed at each sampling point as the probe 2 scans laterally across the sample surface. The energy dissipation signal $\overline{P}_{tip}$ can then be recorded and displayed (either directly or as a component of another signal) as a function of lateral position on the sample to provide an indication of sample composition. The stored and displayed signal could, for example, be indicative of the loss of a visco-elastic material, the bonding energy of a biological sample, or the dissipation of a magnetic sample. The energy dissipation signal $\overline{P}_{tip}$ also could be used as a feedback signal for the oscillator 6 to reduce the likelihood of probe tip wear or sample damage.

As should be appreciated from the above, the accuracy of the energy dissipation measurement corresponds directly to the accuracy with which $\omega_o$, Q, and $A_o$ are known. One or more of these values may change during a scanning operation. Hence, while it is conceivable that these parameters could be measured only once at the beginning of a scanning operation or even determined prior to a scanning operation and prestored in the memory of the computer 14, it is possible that the scanning operation (and the accompanying energy dissipation measurement operation) be interrupted at regular intervals so that any changes in $\omega_o$, Q, and $A_o$ can be detected. A logical period for this measurement is once per scan line.

Many changes and modifications may be made to the invention without departing from the spirit thereof. The scope of some of these changes have already been discussed. The scope of others will become apparent from the attached claims.

We claim:

1. A method of measuring energy dissipation during interaction between a probe and a sample during oscillatory operation of an atomic force microscope, said probe comprising 1) a cantilever having a base and a free end and 2) a probe tip mounted on said cantilever free end, said method comprising:

(A) placing said probe in an operative position in which it is in oscillatory interaction with said sample;

(B) measuring an amplitude of probe oscillation and generating an amplitude signal indicative thereof;

(C) measuring a phase shift of said cantilever free end relative to said cantilever base and generating a phase signal indicative thereof; and (D) combining the phase and amplitude signals and generating a dissipation signal indicative of energy dissipated due to interaction between said probe and said sample.

2. A method as defined in claim 1, further comprising generating and displaying, using said dissipation signal, a humanly-discernable signal indicative of energy dissipated by said probe tip.

3. A method as defined in claim 1, wherein said dissipation signal is indicative of average power dissipation per unit time.

4. A method as defined in claim 1, further comprising, prior to said Step (A), moving said probe to a reference position which is spaced above said operative position and measuring a quality factor (Q) indicative of the quantity of energy dissipated by oscillation of said probe in said reference position.

5. A method as defined in claim 4, wherein said reference position is less than 100 nm above said operative position.

6. A method as defined in claim 4, wherein said reference position is about 20 nm to 30 nm above said operative position.

7. A method of measuring energy dissipation during interaction between a probe tip of a probe and a sample during oscillatory operation of an atomic force microscope, said probe tip being mounted on a cantilever which has a free end on which said probe tip is mounted and which has a base, said method comprising:

(A) delivering oscillatory power of a desired amplitude and frequency from a driver to said probe; then (B) placing said probe in a reference position in which said probe oscillates without contacting said sample but is subject to squeeze-film damping, and measuring a quality factor indicative of the quantity of energy dissipated by oscillation of said probe in said reference position and generating a quality signal (Q) indicative thereof;

(C) placing said probe in a scanning position in which it is in oscillatory intermittent contact with said sample;

(D) while said probe is in said scanning position (1) measuring the amplitude of probe tip oscillation and generating an amplitude signal (A) indicative thereof, and (2) measuring a phase shift of said cantilever free end relative to said cantilever base and generating a phase signal ($\phi$) indicative thereof; and (E) combining the phase, amplitude, and quality signals ($\phi$), (A), and (Q) so as to produce a dissipation signal ($\overline{P}_{TIP}$) indicative of energy dissipated due to interaction between said probe tip and said sample, wherein the combining step is performed according to the equation:

$$\overline{P_{tip}} = \frac{1}{2} \frac{KA^2\omega}{Q} \left[ \frac{QA_d \sin\varphi}{A} - \frac{\omega}{\omega_0} \right]$$

where:
- k is the spring constant of the probe cantilever;
- $A_d$ is a drive amplitude of the cantilever; and
- $\omega_o$ is the natural resonant frequency of the cantilever in the absence of any energy dissipation.

8. A method as defined in claim 7, further comprising generating and displaying, using said dissipation signal, a humanly-discernable signal indicative of energy dissipated by said probe tip.

9. A method as defined in claim 7, wherein said driver drives said probe to oscillate at $\omega_o$ so that said equation becomes:

$$\overline{P_{tip}} = \frac{1}{2} \frac{kA^2 \omega_0}{Q} \left[ \left( \frac{A_0}{A} \right) \sin\varphi - 1 \right]$$

where:
- $A_o$ is the amplitude of the cantilever at resonance; and
- $A_o$ is $Q A_d$.

10. A method as defined in claim 7, wherein said dissipation signal is indicative of average power dissipation per unit time.

11. A method of measuring energy dissipation during interaction between a probe and a sample during oscillatory operation of an atomic force microscope, said method comprising:
  (A) placing said probe into oscillatory interaction with said sample;
  (B) measuring at least one parameter of probe oscillation; and
  (C) determining, based on the measured parameter and information concerning response parameters of said probe and drive parameters of said probe, a value indicative of energy dissipated due to interaction between said probe and said sample.

12. A method of measuring energy dissipation during interaction between a probe and a medium of interest during oscillatory operation of an atomic force microscope, said method comprising:
  (A) measuring, during probe oscillation, at least one effect of said interaction on probe oscillation; and
  (B) determining, based on said measurement, a value indicative of energy dissipated during probe operation.

13. An atomic force microscope comprising:
  (A) a probe which includes (1) a cantilever having a base and a free end and (2) a probe tip mounted on said free end of said cantilever;
  (B) a driver which drives said probe to oscillate;
  (C) a detector which measures an amplitude of probe oscillation and which generates an amplitude signal indicative thereof;
  (D) a detector which measures a phase shift of said cantilever free end relative to said cantilever base and which generates a phase signal indicative thereof; and
  (E) a computer which is operatively coupled to said detectors, which combines the phase and amplitude signals with data indicative of physical properties of said probe, and which produces a dissipation signal indicative of energy dissipated due to interaction between said probe and said sample.

14. An atomic force microscope as defined in claim 13, further comprising a display device which is operatively coupled to said computer and which displays a humanly-discernable signal indicative of energy dissipated by said probe.

15. An atomic force microscope as defined in claim 13, wherein said dissipation signal is indicative of power dissipation per unit time.

16. An atomic force microscope as defined in claim 13, wherein said amplitude detector comprises an RMS detector and said phase detector comprises a separate phase detector.

17. An atomic force microscope as defined in claim 13, wherein said amplitude detector and said phase detector are combined in a single two-phase lock-in amplifier.

\* \* \* \* \*